United States Patent [19]

Kawamoto

[11] Patent Number: 4,497,216
[45] Date of Patent: Feb. 5, 1985

[54] GEAR OPERATING MECHANISM OF AN AUTOMOTIVE MANUAL TRANSMISSION

[75] Inventor: Tamio Kawamoto, Yokohama, Japan

[73] Assignee: Nissan Motor Company, Limited, Japan

[21] Appl. No.: 379,510

[22] Filed: May 18, 1982

[30] Foreign Application Priority Data

May 19, 1981 [JP] Japan .................................. 56-74099

[51] Int. Cl.³ ........................ B60K 20/00; G05G 5/10
[52] U.S. Cl. .................................. 74/475; 74/473 R; 74/477
[58] Field of Search ...................... 74/473 R, 475, 477

[56] References Cited

U.S. PATENT DOCUMENTS

| | | | |
|---|---|---|---|
| 1,089,186 | 3/1914 | Brockman | 74/477 |
| 1,209,782 | 12/1916 | Tullar | 74/475 |
| 1,685,502 | 9/1928 | Pearmain | 74/477 |
| 2,798,382 | 7/1957 | Fletcher et al. | 74/473 |
| 2,929,260 | 3/1960 | Hodkin | 74/473 R |
| 3,241,640 | 3/1966 | McCordic et al. | 74/475 |
| 3,461,739 | 8/1969 | Viegas | 74/473 |
| 3,500,697 | 3/1970 | Schowalter | 74/477 |
| 4,022,079 | 5/1977 | Hidaka | 74/476 |
| 4,228,693 | 10/1980 | Kelbel | 74/339 |
| 4,277,983 | 7/1981 | Izumi et al. | 74/475 |
| 4,337,675 | 7/1982 | Holdeman | 74/477 |
| 4,370,897 | 2/1983 | Carlo | 74/475 |

FOREIGN PATENT DOCUMENTS 688842 3/1953 United Kingdom .................. 74/473

*Primary Examiner*—Allan D. Herrmann
*Assistant Examiner*—Michael J. Gonet
*Attorney, Agent, or Firm*—Lowe, King, Price & Becker

[57] ABSTRACT

In a manual transmission having a gear which is axially slidable from its neutral position to its operating position, there is provided a gear operating mechanism which is constructed to positively prevent the undesirable "gear disengagement". The mechanism comprises an operating lever pivotable about a first axis relative to the transmission case to move the gear between the neutral position and the operating position; a handling lever pivotable about a second axis relative to the transmission case, the second axis being parallel with the first axis; and means for providing a cam-connection between the operating and handling levers in such a manner that the pivotal movement of the handling lever about the second axis within a predetermied angular range induces through the operating lever the movement of the gear between the neutral and operating positions, wherein the parts are so arranged that when, with the gear assuming the operating position, a force is applied to the gear to urge the same in a direction from the operating position to the neutral position, at least a part of the force is received by the transmission case through the operating lever, the handling lever and the means.

4 Claims, 3 Drawing Figures

GEAR OPERATING MECHANISM OF AN AUTOMOTIVE MANUAL TRANSMISSION

BACKGROUND OF THE INVENTION

1. Field of the Invention

The present invention relates in general to an automotive selected gear sliding type manual transmission, and more particularly to a gear operating mechanism of the transmission, which has means for positively preventing the undesirable gear disengagement phenomenon.

2. Description of the Prior Art

In a manual transmission of a selected gear sliding type, a so-called "gear disengagement" sometimes happens particularly in a long-used transmission. The gear disengagement is an undesirable phenomenon in which the gear assuming an operating or engaged position suddenly and unexpectedly disengages from the associated gears thereby suddenly breaking the power transmitting connection between the engine and the driven road wheels. In order to solve such undesirable and dangerous phenomenon, various measures have been hitherto proposed. However, some of them have been made at the sacrifice of handling comfortableness and production cost of the transmission.

SUMMARY OF THE INVENTION

Therefore, it is an essential object of the present invention to provide a gear operating mechanism of an automotive selected gear sliding type manual transmission, which positively prevents the undesired "gear disengagement" without sacrificing the handling comfortableness and the production cost of the transmission.

According to the present invention, there is provided, in a selected gear sliding type manual transmission having a gear which is axially slidable from its neutral position where it disengages from the associated gears to its operating position where it engages with the associated gears, a gear operating mechanism. The gear operating mechanism comprises a first lever pivotally movable about a first axis relative to a transmission case to move the gear between the neutral position and the operating position. A second lever is pivotally movable about a second axis relative to the transmission case, the second axis being parallel with the first axis. First means provides a cam-connection between the first lever and the second lever in such a manner that the pivotal movement of the second lever about the second axis within a predetermined angular range induces through the first lever the movement of the gear between the neutral and operating positions. A second means pivotally moves the second lever about the second axis in response to the movement of a speed change shift lever of the transmission, wherein the first lever, the second lever and the first means are so arranged and constructed that when, with the gear assuming the operating position, a force is applied to the gear to urge the same in a direction from the operating position to the netural position, at least a part of the force is received by the transmission case through the first lever, the second lever and the first means.

BRIEF DESCRIPTION OF THE DRAWINGS

Other objects and advantages of the present invention will become clear from the following description when taken in conjunction with the accompanying drawings, in which.

DETAILED DESCRIPTION OF THE INVENTION

In order to facilitate the explanation of the invention, the following description will be made with respect to a reverse gear operating mechanism which is associated with a fifth speed synchronizing clutch mechanism. However, the present invention is not limited to such reverse gear operating mechanism, but applicable widely to any mechanism so long as it includes an axially slidable gear for effecting a predetermined gear ratio.

Figure 1:
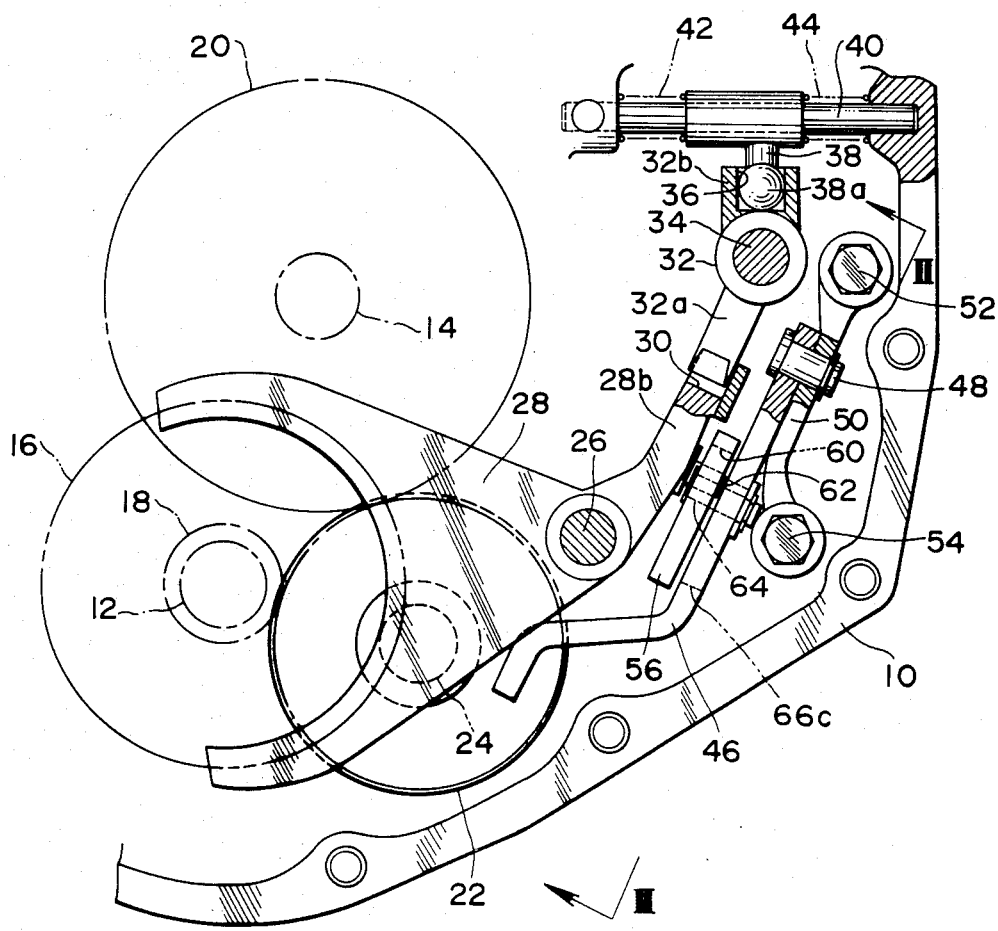
FIG. 1 is a laterally sectioned view of an automotive manual transmission of a selected gear sliding type, which is equipped with a reverse gear operating mechanism embodying the present invention.
Figure 2:
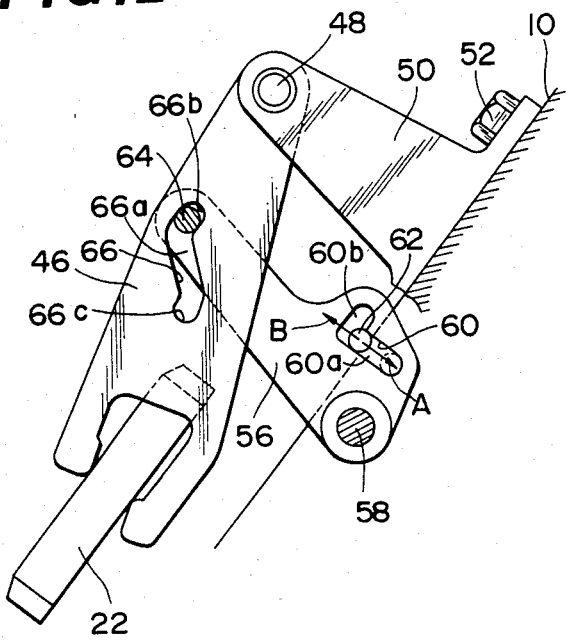
FIG. 2 is a view taken on the line II—II of FIG. 1, with some parts omitted for clarification of the drawing.

Referring to FIGS. 1 and 2, especially FIG. 1, there is shown a part of an automotive manual transmission, where a reverse gear operating mechanism according to the present invention is arranged.

Within a case 10 of the transmission, there are parallel input and output shafts 12 and 14 which are rotatable about the respective axes thereof relative to the transmission case 10. Denoted by numeral 16 is a coupling sleeve of a fifth speed synchronizing clutch mechanism. This mechanism is mounted about the input shaft 12 for smoothly connecting a fifth speed input gear (which is journalled on the input shaft 12 and constantly meshed with a fifth speed output gear securely mounted on the output shaft 14) to the input shaft 12 thereby to smoothly establish the fifth speed gear ratio. A reverse input gear 18 is securely mounted on the input shaft 12 to rotate therewith, while, a reverse output gear 20 is secured to the output shaft 14 at a position near the reverse input gear 18. A reverse idler gear 22 is rotatably and axially slidably disposed on a stationary shaft 24 which extends parallel with the input and output shafts 12 and 14. The reverse idler gear 22 is movable on the shaft 24 from an operating position where it meshes with both the reverse input gear 18 and the reverse output gear 20 to an inoperative or neutral position where it disengages from them. Thus, under the operating condition of the idler gear 22, the reverse input gear 18 and the reverse output gear 20 rotate together to effect the reverse condition of the transmission.

Denoted by numeral 26 is a fork shaft which extends parallel with the input and output shafts 12 and 14 and is secured to the transmission case 10. A shift fork 28 is axially slidably mounted at its hub section on the fork shaft 26. The shift fork 28 has at its one end a bifurcated arm portion 28a which holds the coupling sleeve 16. The shift fork 28 is formed with an arm portion 28b which extends from the hub section thereof in a direction opposite to the bifurcated arm portion 28a. The leading end of the arm portion 28b is formed with a recess 30 into which a portion of a pivoting lever 32 is insertable.

The pivoting lever 32 has two arms 32a and 32b which extend in opposite directions from the hub section thereof. The pivoting lever 32 is rotatably and axially slidably disposed on a stationary shaft 34 which extends parallel with the input and output shafts 12 and 14. The leading end of the arm 32a is inserted into the recess 30 of the shift fork arm portion 28b to engage therewith when the pivoting lever 32 assumes a predetermined angular position relative to the shaft 34. The other arm 32b of the pivoting lever 32 is formed with a blind hole 36.

Slidably received in the blind hole 36 of the pivoting lever 32 is a spherical head portion 38a of a speed change arm 38. The speed change arm 38 is rotatably and axially slidably disposed at a hub section thereof on a stationary rod 40 which extends perpendicular to the shaft 34. First and second springs 42 and 44 are mounted about the rod 40 to put therebetween the hub section of the speed change arm 38 so that the arm 38 is resiliently held and balanced in an axial position.

In accordance with the present invention, there is provided an operating or first lever 46 in order to axially move the idler gear 22 on the shaft 24. One end of the operating lever 46 is pivotally connected through a pivoting pin 48 to a bracket 50 which is secured to the transmission case 10 by bolts 52 and 54, so that the operating lever 46 is movable over a flat plane which is parallel with the axis of the idler gear shaft 24. The other end of the operating lever 46 is forked into two arm portions which straddle the idler gear 22 to hold the same, as is understood from FIGS. 2 and 3.

In accordance with the present invention, there is further provided a handling or second lever 56 which lies near the operating lever 46. As is seen from FIG. 2, the base portion of the handling lever 56 is pivotally connected through a pivot shaft 58 to the transmission case 10, so that the handling lever 56 is movable over a flat plane which is parallel with another flat plane over which the operating lever 46 is movable. The handling lever 56 is formed near the base portion thereof with a L-shaped slot 60 which consists of first and second straight sections 60a and 60b which intersect at right angles. A guide pin 62 secured to the arm portion 28b of the shift fork 28 is slidably received in the slot 60. The positional relation between the slot 60 and the pin 62 is so established that when the shift fork 28 assumes an axial position causing the coupling sleeve 16 to assume its neutral or disengaged position, the pin 62 is placed at the position indicated by a solid line in FIG. 2, that is, at the inward end of the first straight section 60a near the second straight section 60b. The handling lever 56 can assume a position where when the shift fork 28 moves in a direction to cause the coupling sleeve 16 to move from the neutral position to its operating or engaged position to establish the fifth speed gear ratio, the pin 62 on the shift fork 28 moves in the first straight section 60a of the slot 60 in the direction of the arrow A, that is, from the position indicated by the solid line to the position indicated by a phantom line in FIG. 2, without moving the handling lever 56 about the pivoting shaft 58, while, when the shift fork 28 moves in the opposite direction to cause the coupling sleeve 16 to move from the operating position toward the neutral position, the pin 62 moves in the direction of the arrow B and moves, after contact with the inward peripheral portion of the second straight section 60b, in and along the section 60b forcing the handling lever 56 to rotate about the pivoting shaft 58 in the counterclockwise direction in FIG. 2.

The handling lever 56 is provided at its leading end with a guide pin 64 secured thereto which is slidably received in an S-shaped slot 66 formed in the operating lever 46. As is seen from FIGS. 2 and 3, the slot 66 consists of a main straight section 66a, and first and second end sections 66b and 66c which extend outward in opposite directions from opposed ends of the main straight section 66a. As shown, the sections 66b and 66c are inclined with respect to the main straight section 66a. The slot 66 is so formed that when the handling lever 56 assumes the position as shown in FIG. 2, the pin 64 contacts with the bottom of the first end section 66b, and at this time, the first and second end sections 66b and 66c are arranged to extend tangentially with respect to respective circles of which centers lie on the axis of the pivoting shaft 58. With this link connection between the handling lever 56 and the operating lever 46, the above-stated counterclockwise rotation of the handling lever 56 induces a clockwise rotation of the operating lever 46 about the pivoting pin 48 in FIG. 2, forcing the guide pin 64 to move in and along the slot 66 toward the second end section 66c.

In the following, operation will be described with reference to the drawings. For ease with which the description is made, it will be commenced with respect to a neutral condition wherein both the fifth forward gear ratio and the reverse condition are not established. FIGS. 1 and 2 show such a netural condition.

When, now, the driver effects a select operation to move the shift lever (not shown) to a temporary position ready for the fifth forward gear or the reverse, the speed change arm 38 (see FIG. 1) is moved on and along the rod 40 in a direction to cause the leading end of the pivoting lever arm 32a to engage with the recess 30 of the shift fork arm portion 28b. When, then, the driver effects a shift operation to move the shift lever (not shown) to the fifth forward gear position, the speed change arm 38 is rotated about the rod 40 in a direction to cause the shift fork 28 to axially slide on the fork shaft 26 in a given direction. With this movement, the coupling sleeve 16 comes to its operating position to establish the fifth forward gear ratio.

During the above-stated shift operation, the guide pin 62 secured to the shift fork 28 is moved in the direction of the arrow A from a position indicated by the solid line in FIG. 2 to another position indicated by a phantom line in the drawing. However, as has been mentioned hereinabove, such movement of the guide pin 62 does not induce any movement of the handling lever 56 about the pivoting shaft 58, so that the operating lever 46 is stationarily held in the position shown in FIG. 2. Thus, during the speed change operation for the fifth forward gear ratio, the idler gear 22 keeps its neutral position which is indicated by a phantom line in FIG. 3.

When, after the select operation of the shift lever (not shown) to the temporary position ready for the fifth forward gear or the reverse, the driver effects a shift operation to move the shift lever to the reverse position, the speed change arm 38 is rotated about the rod 40 in the opposite direction causing the shift fork 28 to move the coupling sleeve 16 to its inoperative position. During this reverse movement of the shift fork 28, the guide pin 62 secured to the shift fork 28 is moved in the direction of the arrow B and thus rotates the handling lever 56 about the pivoting shaft 58 in the counterclockwise direction in FIG. 2. With this movement of the handling lever 56, the operating lever 46 come to the position indicated by a solid line in FIG. 3 shifting the idler gear 22 from the inoperative position indicated by the phantom line in FIG. 3 to the operating position indicated by a solid line in the drawing. Thus, the reverse condition is established in the transmission.

Figure 3:
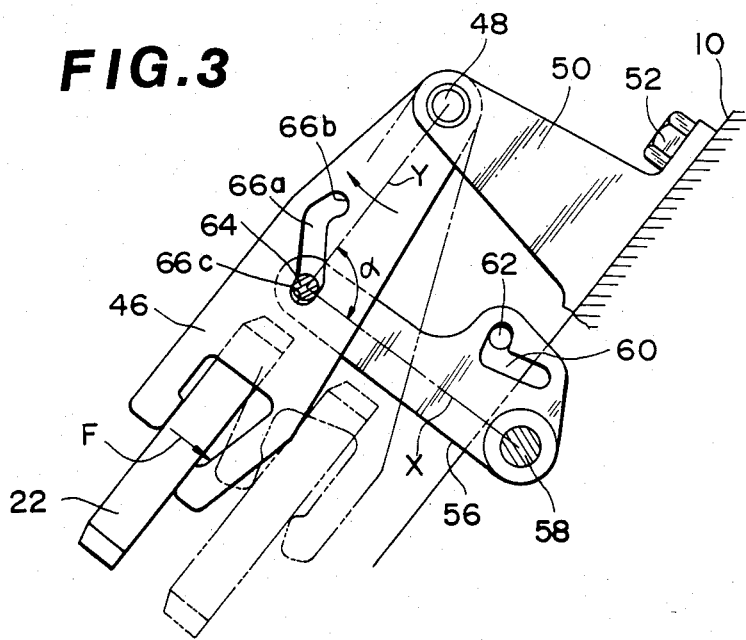
FIG. 3 is a view similar to FIG. 2, but showing a different operating condition of the mechanism.

When, now, the reverse idler gear 22 at its operating condition is applied with a force F in a direction to cause the undesired gear disengagement as shown in FIG. 3, at least a part of the force F is received by the transmission case 10 through the operating lever 46, the guide pin 64, the handling lever 56 and the pivoting shaft 58. Thus, the gear disengagement does not occur in the gear operating mechanism of the invention.

If desired, the parts may be so arranged that when the idler gear 22 assumes its operating position, a straight line X which perpendicularly intersects both the axes of the pivoting shaft 58 and the guide pin 64 is perpendicular to another straight line Y which perpendicularly intersects both the axes of pivoting pin 48 and the guide pin 64. According to this construction, almost all of the force F is received by the transmission case 10 through the linked parts thereby improving the gear disengagement preventing phenomenon much more effectively.

What is claimed is:

1. In a selected gear sliding type manual transmission having a gear which is axially slidable from a neutral position where it disengages from associated gears to an operating position where it engages with the associated gears, a gear operating mechanism comprising:
   a first lever pivotally movable about a first axis relative to a transmission case to move said gear between said neutral position and said operating position;
   a second lever pivotally movable about a second axis relative to said transmission case, said second axis being generally parallel with said first axis;
   first means for providing a cam-connection between said first lever and said second lever so that pivotal movement of said second lever about the second axis within a predetermined angular range causes pivotal movement of said first lever about said first axis and movement of said gear between said neutral and operating positions, said first means including a guide pin secured to an end of said second lever and a generally S-shaped slot formed in said first lever to slidably receive therein said guide pin, said slot having a generally straight section and first and second end sections extending outward in opposite directions from opposite ends of said main straight section, said first and second end sections thereby being inclined with respect to the main straight section; and
   second means for pivotally moving said second lever about said second axis in response to movement of a speed change shift lever of the transmission,
   wherein said first lever, said second lever and said first means are arranged so that when said gear assumes the operating position, and an inadvertent disengaging force is applied to urge the gear from the operating position to the neutral position, at least a part of the force is transmitted to said transmission case through said first lever, said second lever and said first means to prevent disengagement of said gear from the operating position.

2. A gear operating mechanism as claimed in claim 1, wherein said slot is formed so that when said first and second levers assume respective positions to cause said gear to assume the neutral position, said guide pin contacts with the bottom of said first end section with said first and second end sections arranged to extend tangentially with respect to respective circles of which centers lie on said second axis.

3. A gear operating mechanism as claimed in claim 2, wherein said first and second levers are arranged such that when they assume respective positions to cause said gear to assume the operating position, a straight line which perpendicularly intersects both the second axis and an axis of said guide pin is perpendicular to another straight line which perpendicularly intersects both the first axis and the axis of said guide pin.

4. A gear operating mechanism as claimed in claim 2, wherein said second means includes:
   a guide pin secured to a shift fork axially movable along a fork shaft to engage or disengage a predetermined gear ratio of the transmission; and
   an L-shaped slot formed in said second lever proximate to said second axis to slidably receive therein said guide pin.

* * * * *